235-380 SR

2/21/84 XR 4,433,437

United States Patent [19] [11] 4,433,437

Fantone [45] Feb. 21, 1984

[54] METHOD AND APPARATUS FOR VERIFYING SECURITY LABELS

[75] Inventor: Stephen D. Fantone, Saugus, Mass.

[73] Assignee: Polaroid Corporation, Cambridge, Mass.

[21] Appl. No.: 262,898

[22] Filed: May 12, 1981

[51] Int. Cl.³ .............................................. G06K 9/00

[52] U.S. Cl. ...................................... 382/31; 235/375; 235/380; 235/457; 235/487; 340/825.34; 350/162.2

[58] Field of Search ............... 235/448, 440, 454, 457, 235/470, 487, 488, 494, 379-382, 375; 382/31, 12, 56; 250/550, 555, 556, 566, 237 G; 350/6.7-6.9, 167, 162.16, 162.17, 162.2, 162.23; 283/8 R; 340/825.3-825.34, 825.63-825.65

[56] References Cited

U.S. PATENT DOCUMENTS

| | | | |
|---|---|---|---|
| 3,312,955 | 4/1967 | Lamberts et al. | 350/162.2 |
| 3,412,493 | 11/1968 | French | 235/487 |
| 3,753,249 | 8/1973 | Silverman | 235/457 |
| 3,814,904 | 6/1974 | Russell et al. | 235/487 |
| 4,011,435 | 3/1977 | Phelps et al. | 235/487 |
| 4,023,010 | 5/1977 | Horst et al. | 235/487 |
| 4,029,944 | 6/1977 | Trenkamp | 235/440 |
| 4,034,211 | 7/1977 | Horst et al. | 235/487 |
| 4,101,784 | 7/1978 | Key et al. | 235/454 |
| 4,136,821 | 1/1979 | Sugiura et al. | 235/454 |
| 4,180,204 | 12/1979 | Koenig et al. | 235/454 |
| 4,201,338 | 5/1980 | Keller | 235/454 |
| 4,204,638 | 5/1980 | Laude | 235/454 |
| 4,211,918 | 7/1980 | Nyfeler et al. | 235/487 |
| 4,250,393 | 2/1981 | Greenaway | 250/566 |
| 4,352,564 | 10/1982 | Roach | 250/550 |

*Primary Examiner*—Leo H. Boudreau

*Attorney, Agent, or Firm*—Francis J. Caufield

[57] ABSTRACT

Electro-optical apparatus for verifying the authenticity of security labels of the type having a series of lenticules of predetermined spatial frequency formed thereon. The apparatus is structured to accept and support a security label to be verified so that the lenticules thereof lie in a flat or nearly flat plane. A laser beam is directed at the flat plane at a predetermined angle of incidence so that the lenticules of the security label in the flat plane diffract the laser beam into a series of wavefronts which reinforce one another to form a diffraction pattern having principle maxima that are separated by equal or nearly equal angles. An optical system and associated electronic circuit operate to measure the angular separation between successive predetermined ones of the diffraction pattern principle maxima and determine the spatial frequency of the lenticules of the security label whereby the authenticity of the security label can be verified by comparing the spatial frequency of its lenticules with a predetermined standard spatial frequency. Methods inherent in the use of the apparatus are also included.

3 Claims, 3 Drawing Figures

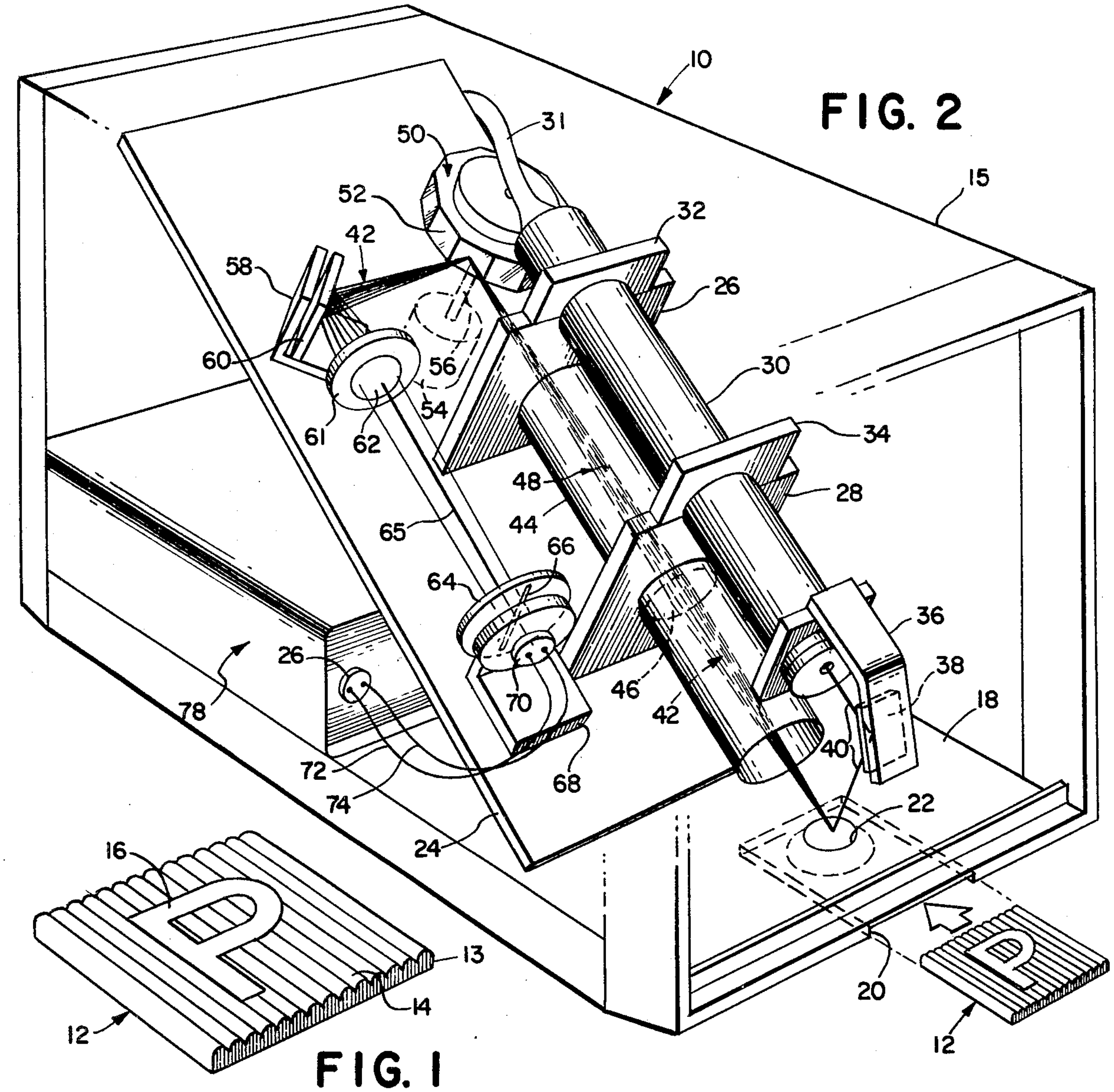
FIG. 2
FIG. 1
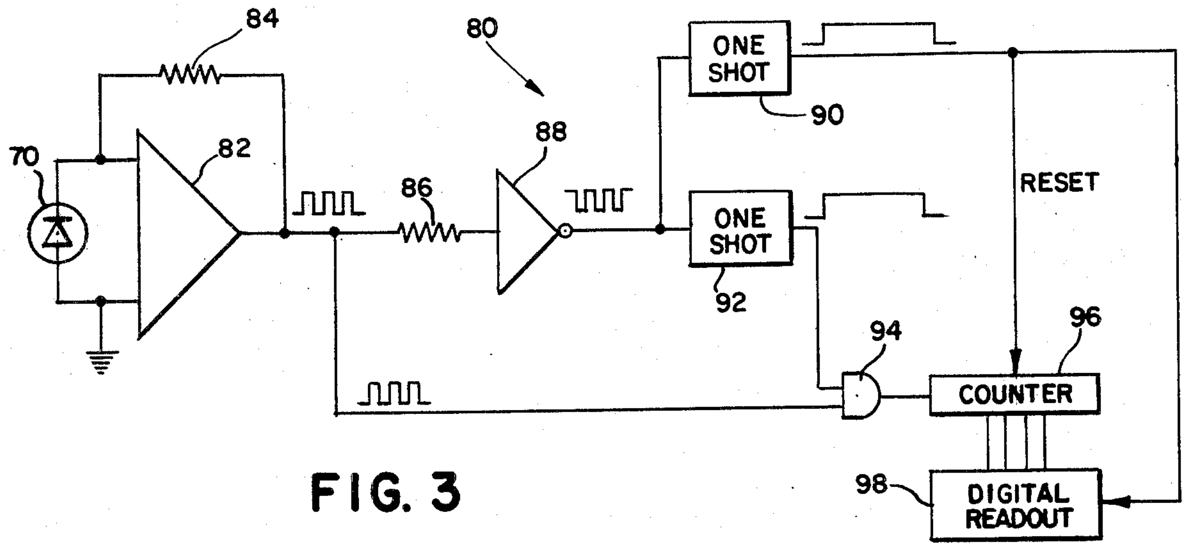
FIG. 3

METHOD AND APPARATUS FOR VERIFYING SECURITY LABELS

BACKGROUND OF THE INVENTION

1. Field of the Invention

This invention in general relates to counterfeit detection devices and, in particular, to an electro-optical scanning device for verifying the authenticity of security labels of the type having parallel lenticules of predetermined spatial frequency formed thereon.

2. Description of the Prior Art

The counterfeiting and sale of trademarked or brand name products is a severe problem which causes legitimate manufacturers substantial financial damage because of lost sales. To discourage counterfeiting, those skilled in the art have provided security labels which can be attached to products by the manufacturer to alert consumers and retailers that a trademarked item is not authentic. One common form for such security labels comprises plastic laminar structures having integrally formed therewith a security feature by which the authenticity of such labels can be verified. The security features in the past have been, for example, magnetic codes for subsequent verification through magnetic decoding. Also used as security features have been light transmissive pigment materials, light polarizing dyes and phosphorescent materials arranged to produce optical patterns which can subsequently be verified either through direct visual inspection or through the use of special verifying apparatus. Optical patterns have also been used for this purpose because of their ability to be subsequently verified through the use of optical scanners.

More recently, in U.S. patent application Ser. No. 262,120 filed in May, 1981 in the name of Paul. F. Sullivan and entitled "Verification Device", a novel anti-counterfeiting security label that is virtually counterfeit and simulation proof has been provided. The security label in this disclosure comprises a transparent material with parallel lenticules in the form of cylindrical lenses on one side and parallel colored lines on the other. The lenticules and lines are in perfect registration so that there are one or two colored lines behind each lenticule. The spatial frequency of the lenticules ranges between 1,000 and 2,000 lenticules per inch. Customized logos or emblems are produced by shifting the position of the lenticules and thus the colored line or lines relative to each other within the body of the logo. Variation in the spacing of the lenticules provides a means for producing a variety of visual effects that are observable with the naked eye. Although this security label requires no machine verifier, certain aspects of its structure are compatible with machine sensing devices.

Therefore, it is a primary object of the present invention to provide a device for verifying the authenticity of security labels of the type having a series of parallel lenticules of predetermined spatial frequency formed thereon.

It is another object of the present invention to provide a high-speed device for verifying lenticular type security labels.

Other objects of the invention will, in part, be obvious and will, in part, appear hereinafter. The invention accordingly comprises the apparatus possessing the construction, combination of elements, and arrangement of parts which are exemplified in the following detailed disclosure and the methods inherent in the use of the apparatus described.

SUMMARY OF THE INVENTION

This invention in general relates to counterfeit detection devices and in particular to apparatus for verifying the authenticity of security labels of the type having a series of parallel lenticules of predetermined spatial frequency formed thereon.

The apparatus of the invention comprises means for receiving and supporting a security label to be verified so that the lenticules thereof lie in a flat or nearly flat plane.

Means are also included for providing a beam of radiation and directing the beam of radiation at the flat plane at a predetermined angle of incidence so that the lenticules of the security label in the flat plane diffract the beam of radiation into a series of wavefronts which reinforce one another to form a diffraction pattern having principle maxima that are separated by equal or nearly equal angles.

Also included in the apparatus are means for measuring the angular separation between successive predetermined ones of the diffraction pattern principle maxima and determining the spatial frequency of the lenticules of the security label whereby the authenticity of the security label can be verified by comparing the spatial frequency of its lenticules with a predetermined standard spatial frequency.

In the preferred embodiment of the invention, the beam of radiation is provided by a laser that is arranged so that its beam is in a plane of incidence that is parallel with the elongated dimension of the security label lenticules and impinges on the flat plane at an angle of 45-degrees.

The preferred embodiment also includes a photodetector and optical system that are arranged so that the diffraction pattern maxima are swept across the photodetector at a fixed rate to provide an output signal in the form of a train of pulses whose frequency is linearly related to the spatial frequency of the security label. An electronic circuit is included and is structured to accept the photodetector output and determine the spatial frequency from the output signal pulse frequency.

Methods inherent in the use of the apparatus are also included in the invention.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiments when read in connection with the accompanying drawings wherein like numbers have been employed in the different figures to denote the same parts and wherein:

FIG. 1 is a diagrammatic perspective view of a lenticular type security label showing lenticules thereof greatly enlarged;

FIG. 2 is a perspective view with parts broken away of the apparatus of the invention; and FIG. 3 is a schematic of a circuit which forms part of the apparatus of FIG. 2.

DESCRIPTION OF THE PREFERRED EMBODIMENT

In general, this invention relates to counterfeit detection devices for verifying the authenticity of security labels of the type having parallel lenticules of predetermined spatial frequency formed thereon. In particular, the invention is an electro-optical scanning device, designated generally at 10 in FIG. 2, that is particularly suitable for use in verifying the authenticity of lenticular type security labels of the type designated generally at 12 in FIG. 1.

Referring now to FIG. 1, it can be seen that the security label 12 comprises a transparent sheet 13 which includes parallel rows of regularly spaced cylindrical lenticules 14 shown greatly enlarged. The spatial frequency of the lenticules 14 is preferably between 1000 and 2000 lines per inch. In registration with the lenticules 14 are rows of colored lines that are not shown. Optical effects such as the pattern designated by the P at 16 are introduced by irregularly spaced rows of lenticules and corresponding colored lines which, when viewed against the surrounding background area having regularly spaced rows of lenticules and corresponding colored lines, provide a means for visually verifying the authenticity of the security label 12. The security label 12 is described in considerable detail in previously mentioned U.S. patent application Ser. No. 262,120.

Although the security label 12 can be visually verified, it is desirable to have other means for verifying the authenticity of such labels at high speeds and in large volumes. In a manner to be described, the device 10 satisfies this need by verifying the authenticity of such security labels by rapidly measuring the spatial frequency of the regularly spaced lenticules 14.

The manner in which the device 10 measures the spatial frequency of the security label lenticules 14 may best be understood by now referring to FIG. 2 wherein it can be seen that the device 10 comprises a generally rectangularly shaped housing 15 which includes a base 18. Formed in the base 18 is a slot 20 that is structured to receive a security label 12. The security label 12 slides into the slot 20, lenticular side up, and is supported therein in a well-known manner so that the lenticules 14 thereof lie in a flat or nearly flat plane. An aperture 22 is provided in the base 18 in relative registration with the slot 20 so that, when the security label 12 is located in the slot 20 regularly spaced ones of the security label lenticules 14 are accessible through the aperture 22.

A platform 24 is located within the housing 15 at a predetermined angle with respect to the base 18 to support various components of the device 10 in a predetermined manner. To support various of the components of the device 10 on the platform 24, a pair of spaced apart brackets 26 and 28 are included and are arranged perpendicular to the platform 24. The top portions of the brackets, 26 and 28, are selectively machined to receive and support the cylindrical housing of a laser 30. The laser 30 is fixedly retained within the upper portions of the brackets, 26 and 28, by means of capping members 32 and 34 which attach in a well-known manner to the upper surfaces of the brackets 26 and 28.

Mounted to the forward end of the laser 30 is a bracket 36 on which there is fixedly attached a plane mirror 38 that is positioned in a predetermined manner to receive the beam from the laser (designated at 40) and to reflect the laser beam 40 through the aperture 22 so that the laser beam 40 impinges upon the security label lenticules 14 at a predetermined angle of incidence which is preferably 45-degrees. The laser beam 40, the mounting arrangement for the mirror 38, and the means for receiving and supporting the security label 12 are arranged so that the plane of incidence of the laser beam 40 is parallel with the elongated dimension of the lenticules 14 when the security label 12 is placed within the slot 20. The cross-sectional area of the laser beam 40 is selected to be large enough to cover at least several of the lenticules 14.

As will be recognized by those skilled in the optical arts, the lenticular structure of the security label 12 provides it with the properties of a diffraction grating which has the ability to diffract illumination incident thereto. Thus, when illuminated by the laser beam 40 at the 45-degree incident angle, the lenticules 14 of the security label 12 operate to diffract the laser beam 40 into a series of plane wavefronts which reinforce one another to form a diffraction pattern having principle maxima that are separated by equal or nearly equal angles. The principle maxima of the diffraction pattern appear as a series of rays which spread out in an arcuate fan and are designated generally at 42 in FIG. 2. The equally spaced rays 42, which are referred to as diffracted orders, are directly related to the spatial frequency of the lenticules 14 on the security label 12 and, in a manner to be described, are sensed and measured by the remaining components of the device 10 to determine the spatial frequency of the lenticules 14 of a security label to be verified. Verification of a security label using the device 10 is made when the spatial frequency of a suspect label corresponds with the spatial frequency of a predetermined standard.

The remaining components of the device 10 include a converging lens 46, a polygon-shaped scanner 50, a plane mirror 60, a positive lens 62, a photodetector 70 and mask therefor 64, and an electronic circuit which is designated generally at 80 in FIG. 3. The converging lens 46 is structured in a well-known manner as a highly corrected lens and is mounted within a tube 44 that in turn is mounted in circular holes cut through the vertical brackets, 26 and 28.

The polygon scanner 50 includes a plurality of specularly reflective faces 52 and is mounted for rotation at a predetermined angular velocity via a shaft 56 and motor 54 so that each face 52 thereof rotates about a fixed location at a fixed angular rate. The converging lens 46 is spaced away from the polygon scanner 50 and the aperture 22 by a distance equal to or nearly equal to two focal lengths of the converging lens 46. Positioned and structured in this manner, the converging lens 46 images at least the portion of the security label 12 illuminated by the laser beam 40 onto each polygon face 52 and also operates to converge the diffracted plane wavefronts 42 towards a point at or near each polygon face 52. In the process of converging the diffracted plane wavefronts 42, the lens 46 sharply images preselected plane wavefronts 42 at its focus where they appear as a series of spatially separated dots designated generally at 48. Fron the point on each polygon face 52 on which the wavefronts 42 are brought to convergence, the wavefronts 42 diverge and rotation of the polygon 50 causes them to be swept through a predetermined angular arc each time a polygon face 52 rotates past the plane wavefronts 42.

The mirror 60 which is mounted to the platform 24 via a bracket 58 is structured large enough to intercept the sweeping diffraction pattern segment emanating from the faces of the polygon 52 as the polygon scanner 50 rotates at a fixed angular rate and redirects the sweeping diffraction pattern segment which contains the predetermined maxima (42) of the diffraction pattern along a folded optical path toward the positive lens 62.

The photodetector 70 is preferably a silicon photodiode having a fast response time and is mounted to the platform 24 via a mounting bracket 68. The mask 64 which is located ahead of the photodetector 70 includes a vertically oriented slit 66 to limit the active photoresponsive area of the photodetector 70 that can respond to light and is dimensioned to match the size of the dots 48. The positive lens 62 which is mounted to the platform 24 via a lens mount 61 is arranged to image the dots 48 located at the focus of the lens 46 onto the slit aperture 66 as the diffraction pattern sweeps within its predetermined angular arc so that selected maxima of the diffraction pattern are successively imaged within the slit 66 at a fixed sweep rate. An example of one of the diffraction pattern maxima 42 being imaged in the slot 66 is shown by the ray emerging from the lens 62 and designated at 65.

The photodetector 70 operates to provide an output signal having an electrical characteristic which varies in accordance with the amount of radiant power incident thereto. Therefore, every time one of the diffraction pattern maxima, which are represented by the dots 42, is imaged within the slit 66, the photodetector 70 responds by providing a series of pulses separated by equal time intervals that are linearly proportional to the angular separation between the diffraction pattern maxima.

In the foregoing manner, the combination of the lens 46, the polygon scanner 50, the lens 62, and the mask 64 operate as an optical means for successively imaging the diffraction pattern maxima on the photodetector 70 at a predetermined rate so that the photodetector 70 operates to provide an output signal in the form of a series of pulses separated by equal time intervals which are linearly proportional to the angular separation between the diffraction pattern maxima.

The output signal of the photodetector 70 is fed into the electronic circuit 80 via a pair of leads 72 and 74 which terminate in a plug 26 that is electrically connected to the circuit 80. The plug 26 fits into an electronic and power supply housing 78 in which the electronic circuit 80 is mounted and in which, incidentally, there is a power supply (not shown) for providing the power needs to the laser 30 via a power cord 31.

Referring now to FIG. 3, it can be seen that the photodetector 70 is connected in a well-known manner to a conventional operational amplifier 82 having a feedback resistor 84 associated therewith in a well-known manner. The output of the amplifier and feedback resistor 84 are connected to an inverting amplifier 88 via a resistor 86 and to one terminal of a conventional AND gate 94. The output of the inverting amplifier 88 is connected in common with the inputs to two conventional one-shot timers, 90 and 92. The one-shot 92 is arranged to provide a high output pulse of predetermined duration in the presence of a negative going pulse from the output of the amplifier 88. The duration of the high output signal from the one-shot 92 is preferably selected to be shorter than the train of pulses provided from the output of the photodetector 70 and is connected with the other terminal of the AND gate 94.

The one-shot 90 also provides a high output in the presence of a negative going pulse from the inverting amplifier 88 and the duration of the output pulse from the one-shot 90 is selected to be longer than the output pulse from the one-shot 92 by a predetermined time interval. The output from the one-shot 90 serves as a RESET signal for a conventional counter 96 and a conventional digital readout 98.

The manner in which the circuit 80 operates is as follows. Each time one of the maxima from the diffraction pattern, i.e., one of the dots 48, sweeps over the slit 66, the photodetector 70 provides a pulse and the duration between successive pulses depends on the wavelength of the laser beam 40, the angular rate at which the polygon scanner 50 rotates, the optical geometry of the device 10, and the number of lenticules per inch in the security label 12. The output of the photodetector 70 is then amplified by the combination of the operational amplifier 82 and its associated feedback resistor 84 to provide a successive series of pulses as indicated in FIG. 3. The pulse train from the amplifier 82 and the resistor 84 is then inverted by the inverting amplifier 88 which in turn causes both of the one-shots, 90 and 92, to provide their respective high output signals. The presence of the high output at one of the terminals of the AND gate 94 causes the output of the AND gate 94 to go high each time one of the pulses is present at the other terminal of the AND gate 94. The output of the AND gate 94 is counted by the conventional counter 96 until the output of the one-shot 92 goes low. In this manner, the total number of pulses is counted for a predetermined time interval each time one of the faces 52 of the polygon scanner 50 rotates across the diffraction pattern.

After termination of the pulse count, the output from the one-shot 90 resets the counter 96 and the digital readout 98 in preparation for another pulse train created when another polygon face 52 rotates across the diffraction pattern.

In this manner, intervals between the successive pulses from the photodetector 70 or the frequency of the pulse train can be determined because the optical geometry of the device 10, the laser wavelength and the angular rate of the polygon scanner 50 are all fixed and known. Thus the number displayed by the digital readout is directly correlatable with the spatial frequency of the lenticules 14 on the security label 12.

In the foregoing manner, means have been provided for measuring the angular separation between successive predetermined ones of the principle maxima of the diffraction pattern and for determining the spatial frequency of the lenticules 14 of the security label 12 whereby the authenticity of the security label 12 can be verified by comparing the measured spatial frequency of its lenticules with a predetermined standard spatial frequency.

The methods inherent in the use of the device 10 of the invention are within the scope of the invention and are particularly pointed out in the appended claims. It will be obvious to those skilled in the art that other changes may be made in the above-described embodiment without departing from the scope of the invention. Therefore, it is intended that all matter contained in the above description or shown in the accompanying drawings shall be interpreted as illustrative and not in a limiting sense.

What is claimed is:

1. A method for verifying the authenticity of security labels of the type having a series of parallel lenticules of predetermined spatial frequency formed thereon comprising the steps of:

supporting a security label to be verified so that the lenticules thereof lie in a flat or nearly flat plane;

directing a beam of radiation at said security label at a predetermined angle of incidence so that the lenticules of said security label diffract said beam of radiation into a series of wavefronts which reinforce one another to form a diffraction pattern having principle maxima that are seprated by equal or nearly equal angles;

successively imaging said diffraction pattern maxima on a photodetector at a predetermined rate so that said photodetector operates to provide an output signal in the form of a series of pulses separated by equal time intervals which are linearly proportional to the angular separation between said maxima; and comparing the frequency of said series of pulses against a standard to verify the authenticity of said security label.

2. Apparatus for verifying the authenticity of security labels of the type having a series of parallel lenticules of predetermined spatial frequency formed thereon, said apparatus comprising:

means for receiving and supporting a security label to be verified so that the lenticules thereof lie in a flat or nearly flat plane;

means for providing a beam of radiation and directing said beam of radiation at said flat plane at a predetermined angle of incidence so that the lenticules of the security label when in said flat plane diffract said beam of radiation into a series of wavefronts which reinforce one another to form a diffraction pattern having principle maxima that are separated by equal or nearly equal angles; and means for measuring the angular separation between successive predetermined ones of said principle maxima and determining the spatial frequency of the lenticules of the security label whereby the authenticity of the security label can be verified by comparing the spatial frequency of its lenticules with a predetermined standard spatial frequency, said angular separation measuring and spatial frequency determining means comprising:

(a) a photodetector for providing an output signal having an electrical characteristic which varies in accordance with the amount of radiant power incident thereto;

(b) optical means for successively imaging said diffraction pattern maxima on said photodetector at a predetermined rate so that said photodetector operates to provide said output signal in the form of a series of pulses separated by equal time intervals which are linearly proportional to the angular separation between said maxima; and (c) circuit means for receiving said photodetector output signal and determining the spatial frequency of the security label lenticules.

3. The apparatus of claim 2 wherein said optical means comprises:

a polygon having a series of specularly reflective faces and mounted for rotation at a predetermined angular velocity so that each face of said polygon is rotated about a fixed location at a fixed angular rate;

a highly corrected converging lens spaced away from said polygon and arranged to image at least a portion of said diffraction pattern onto a fixed location with respect to said polygon such that each face of said polygon causes said portion of said diffraction pattern to diverge and sweep within a predetermined angular arc;

a slit aperture arranged ahead of said photodetector; and a positive lens for imaging predetermined segments of said diffraction pattern portion onto said slit aperture as said diffraction pattern sweeps within said predetermined angular arc so that said maxima of said diffraction pattern portion are successively imaged within said slit at a fixed sweep rate to provide said output signal pulse time.

* * * * *